US012582996B2

(12) United States Patent
Whitman

(10) Patent No.: US 12,582,996 B2
(45) Date of Patent: Mar. 24, 2026

(54) GOLD PAN WITH AREAS OF DIFFERING SURFACE TEXTURES

(71) Applicant: Lucian D. Whitman, Lake Isabella (CA)

(72) Inventor: Lucian D. Whitman, Lake Isabella (CA)

( * ) Notice: Subject to any disclaimer, the term of this patent is extended or adjusted under 35 U.S.C. 154(b) by 0 days.

(21) Appl. No.: 17/240,493

(22) Filed: Apr. 26, 2021

(65) Prior Publication Data

US 2022/0410173 A1 Dec. 29, 2022

(51) Int. Cl.
*B03B 5/58* (2006.01)

(52) U.S. Cl.
CPC .................................... *B03B 5/58* (2013.01)

(58) Field of Classification Search
CPC .... B03B 5/02; B03B 5/04; B03B 5/06; B03B 5/28; B03B 5/38; B03B 5/48; B03B 5/52; B03B 5/58; B03B 5/72; B03B 5/74; B03B 13/113
USPC ........................................ 209/479, 484, 506
See application file for complete search history.

(56) References Cited

U.S. PATENT DOCUMENTS 634,120 A * 10/1899 Moore ..................... B03B 5/02 209/447
1,972,645 A * 9/1934 Danills ..................... B03B 5/26 209/447
3,059,776 A 10/1962 Smith
3,855,119 A * 12/1974 Stephenson ............... B03B 5/06 220/660
4,162,969 A * 7/1979 Lagal ........................ B03B 5/06 209/447
4,671,868 A * 6/1987 Ottrok ..................... C22B 11/10 209/48

(Continued)

FOREIGN PATENT DOCUMENTS

AU 2012292866 A1 * 3/2014 ............. B03B 5/626
CA 157048 A 7/1914

(Continued)

OTHER PUBLICATIONS

Sona Enterprises "Gold Pan with two types of Riffles" (Year: 2014).*

(Continued)

*Primary Examiner* — Gene O Crawford
*Assistant Examiner* — Muhammad Awais
(74) *Attorney, Agent, or Firm* — Nath, Goldberg & Meyer; Joshua B. Goldberg

(57) ABSTRACT

The gold pan with areas of differing surface textures includes a disc-shaped, planar bottom panel, and an upwardly and outwardly extending frustoconical sidewall attached to the circular perimeter of the bottom panel. The circular top of the frustoconical sidewall includes a rounded upper rim. The rounded upper rim includes reinforcement ribs, and a hole defined therethrough for hanging the gold pan on a hook or other structure. A downwardly extending flange is attached to the circular perimeter of the bottom panel, for stabilizing the pan on a support surface. The frustoconical sidewall includes a set of circumferentially extending tapering riffles. In addition, the frustoconical sidewall may include a smooth area as well as a second set of circumferentially extending riffles. The second set of riffles can have a constant width and height.

6 Claims, 11 Drawing Sheets

(56) References Cited

U.S. PATENT DOCUMENTS

| | | | | |
|---|---|---|---|---|
| 5,190,158 | A * | 3/1993 | Remias | B03B 5/02 209/397 |
| 5,447,239 | A | 9/1995 | Tubbs, Jr. | |
| D475,727 | S * | 6/2003 | Kelava | B03B 5/06 D15/147 |
| D776,722 | S * | 1/2017 | Weaver | D15/147 |
| 9,662,662 | B1 * | 5/2017 | Weaver | B03B 5/58 |
| 9,676,002 | B2 * | 6/2017 | Guillemin | B07B 13/113 |
| 2017/0348701 | A1 * | 12/2017 | Washburn | B03B 5/06 |

FOREIGN PATENT DOCUMENTS

| | | | | |
|---|---|---|---|---|
| CN | 206082811 | U * | 4/2017 | |
| CN | 109731672 | A * | 5/2019 | B03B 5/52 |
| WO | WO-2012174785 | A1 * | 12/2012 | B03B 5/626 |

OTHER PUBLICATIONS

Turbo Pan "Gold Pan Vortex Action" (Year: 2013).*
Sona "Gold Pan" (Year: 2014).*
Sonar Enterprises "Gold Pan with Two Types of Riffles", Aug. 2, 2014. https://www.amazon.com/SE-GP1014G14-Green-Plastic-Riffles/dp/B00MD02MWE?th=1 (Year: 2014).*
Turbo Pan "Gold Pan" (Year: 2013).*
""SE 12" Green Plastic Gold Pan with Two Types of Riffles—GP1013G12," © 1996-2020, Amazon.com, Inc.: https://www.amazon.com/SE-GP1013G12-Green-Plastic-Riffles/dp/B00IKY42AW.

* cited by examiner

GOLD PAN WITH AREAS OF DIFFERING SURFACE TEXTURES

BACKGROUND

1. Field

The disclosure of the present patent application relates to gold panning implements and particularly, to a gold pan with areas of differing surface textures.

2. Description of the Related Art

Conventional gold pans include, a flat disc-shaped bottom and an outwardly slanted frustoconical sidewall extending from the bottom. The sidewall of a typical pan often includes a set of riffles or ridges of the same size. When different sizes of riffles are needed for a given panning location, multiple pans are typically used. Thus, a gold partner typically has several pans with different sized riffles, depending on the targeted particle size for the panning location or sample condition. Transporting several pans can be burdensome, particularly when traveling by foot to remote locations.

Thus, a gold pan with areas of differing surface textures solving the aforementioned problems is desired.

SUMMARY

As with conventional gold pans, the gold pan with areas of differing surface textures includes a disc-shaped, planar bottom panel, and an outwardly extending frustoconical sidewall extending from the circular perimeter of the bottom panel. An upper edge of the frustoconical sidewall includes a rounded upper rim. The rounded upper rim includes reinforcement ribs and a hole defined therethrough for hanging the gold pan on a hook or other structure. A downwardly extending flange protrudes from the circular perimeter of the bottom panel for stabilizing the pan on a support surface.

The frustoconical sidewall includes a first set of circumferentially extending riffles having a first end and a second end. The first set of riffles can include a plurality of tapering riffles. For example, a height and/or width of each of the tapering riffles can gradually decrease from the second end to the first end. In an embodiment, the sidewall can include a smooth portion between the first end and the second end, in an embodiment, the sidewall can include a second set of circumferentially extending riffles having a first end and a second end. A height and width of each of the riffles of the second set of riffles can be constant from the first end to the second end. In an embodiment, the height of the riffles from the second set of riffles is larger than the largest height of the riffles from the first set of riffles. In an embodiment, the width of the riffles from the second set of riffles is larger than the largest width of the riffles from the first set of riffles. The varying sizes of the riffles obviates the need for multiple gold pans.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
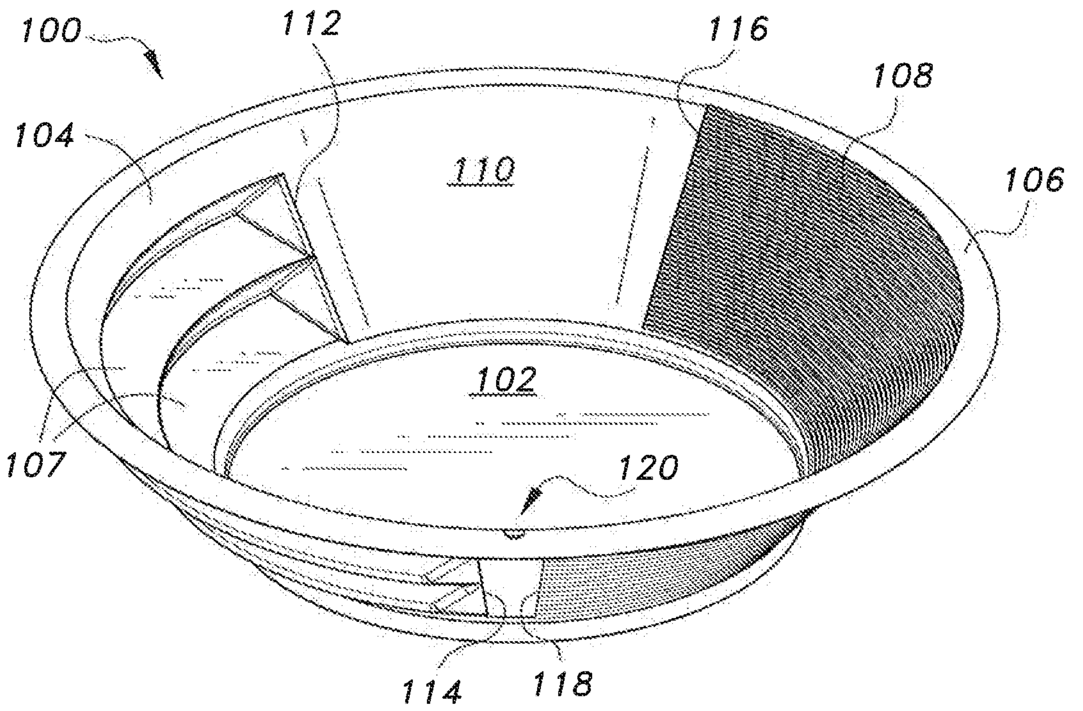
FIG. 1 is a top perspective view of a first embodiment of a gold pan with areas of differing surface textures.
Figure 2:
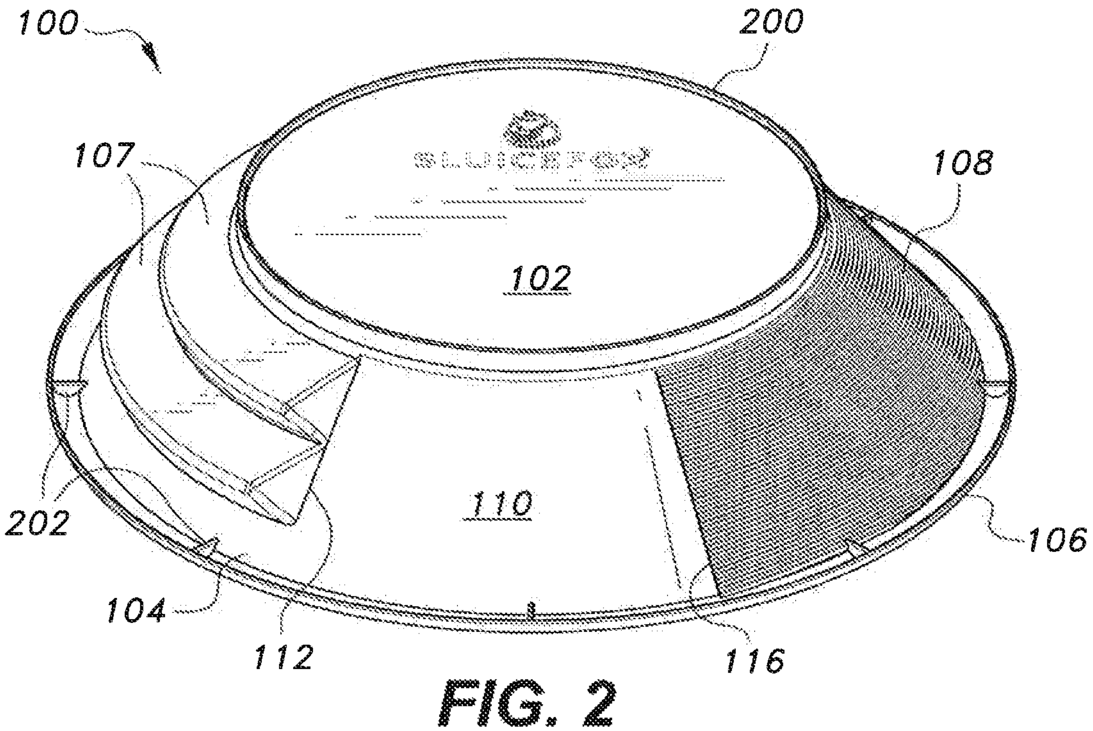
FIG. 2 is a bottom, perspective view of the gold pan of FIG. 1.
Figure 3:
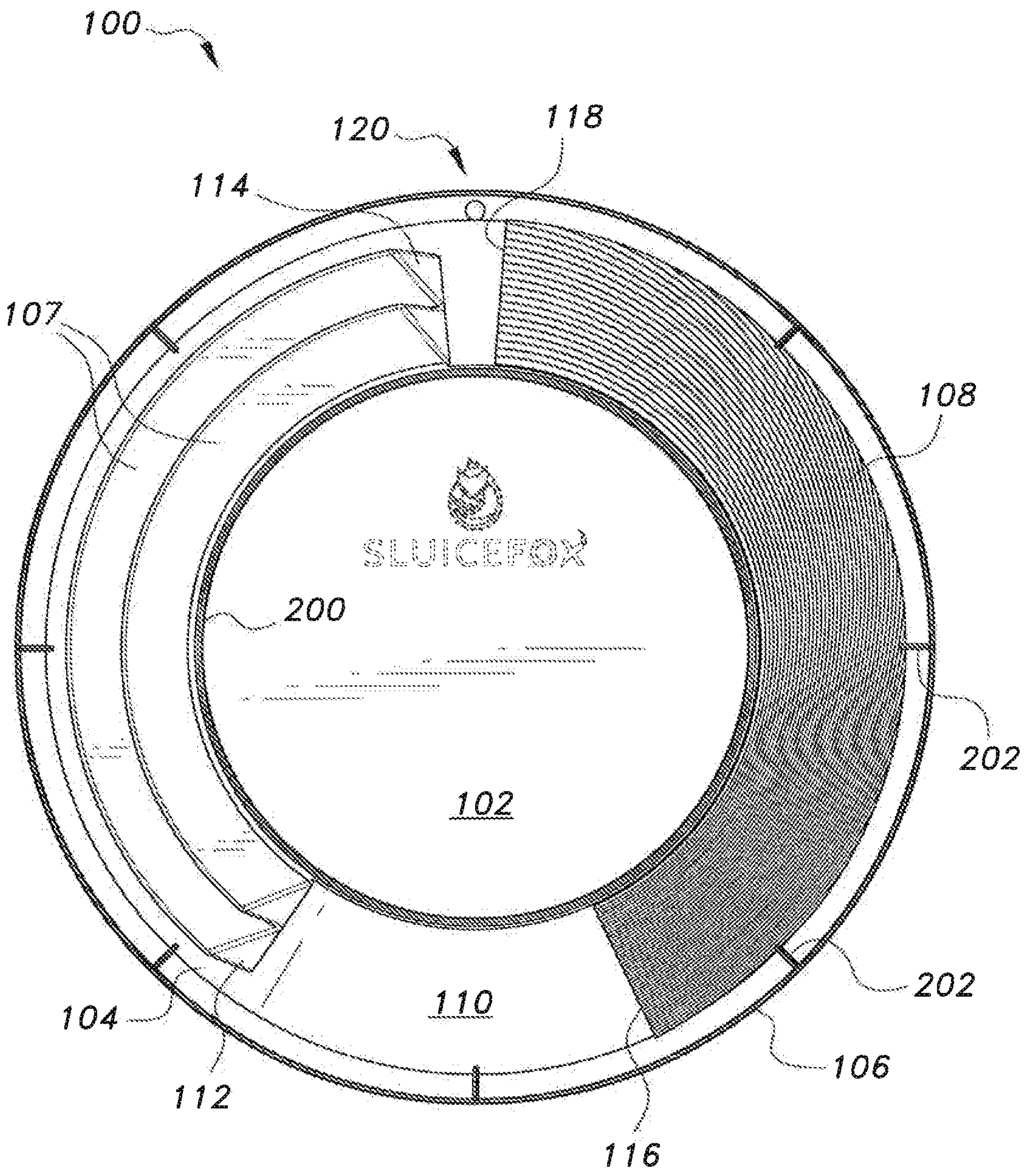
FIG. 3 is a bottom view of the gold pan of FIG. 1.

A first embodiment of a gold pan with areas of differing surface textures 100 is shown in FIGS. 1-8. The gold pan 100 includes a disc-shaped, planar bottom panel 102, and an upwardly and outwardly extending frustoconical sidewall 104 extending from a circular perimeter of the bottom panel 102. The circular top of the frustoconical sidewall 104 includes a rounded upper rim 106. The rounded upper rim 106 includes reinforcement ribs 202 and a hole 120 defined therethrough for hanging the gold pan 100 on a hook or other structure. A downwardly extending flange 200 extends from the circular perimeter of the bottom panel 102, for stabilizing the pan 100 on a support surface.

In this embodiment, the frustoconical sidewall 104 includes a first set of riffles 108, a second set of riffles 107, and a smooth area 110. The first set of riffles 108 includes a first end 116 and a second end 118. The first set of riffles 108 tapering includes a plurality of tapering riffles. In other words, at least one of a width and height of the riffles from the first set of riffles 108 can gradually decrease from the second end 118 to the first end 116. In an embodiment, both the width and height of the riffles from the first set of riffles 108 gradually decreases from the second end 118 to the first end 116. The second set of riffles 107 includes a first end 112 and a second end 114. A width and height of the riffles from the second set of riffles 107 can be constant from the first end

Figure 4:
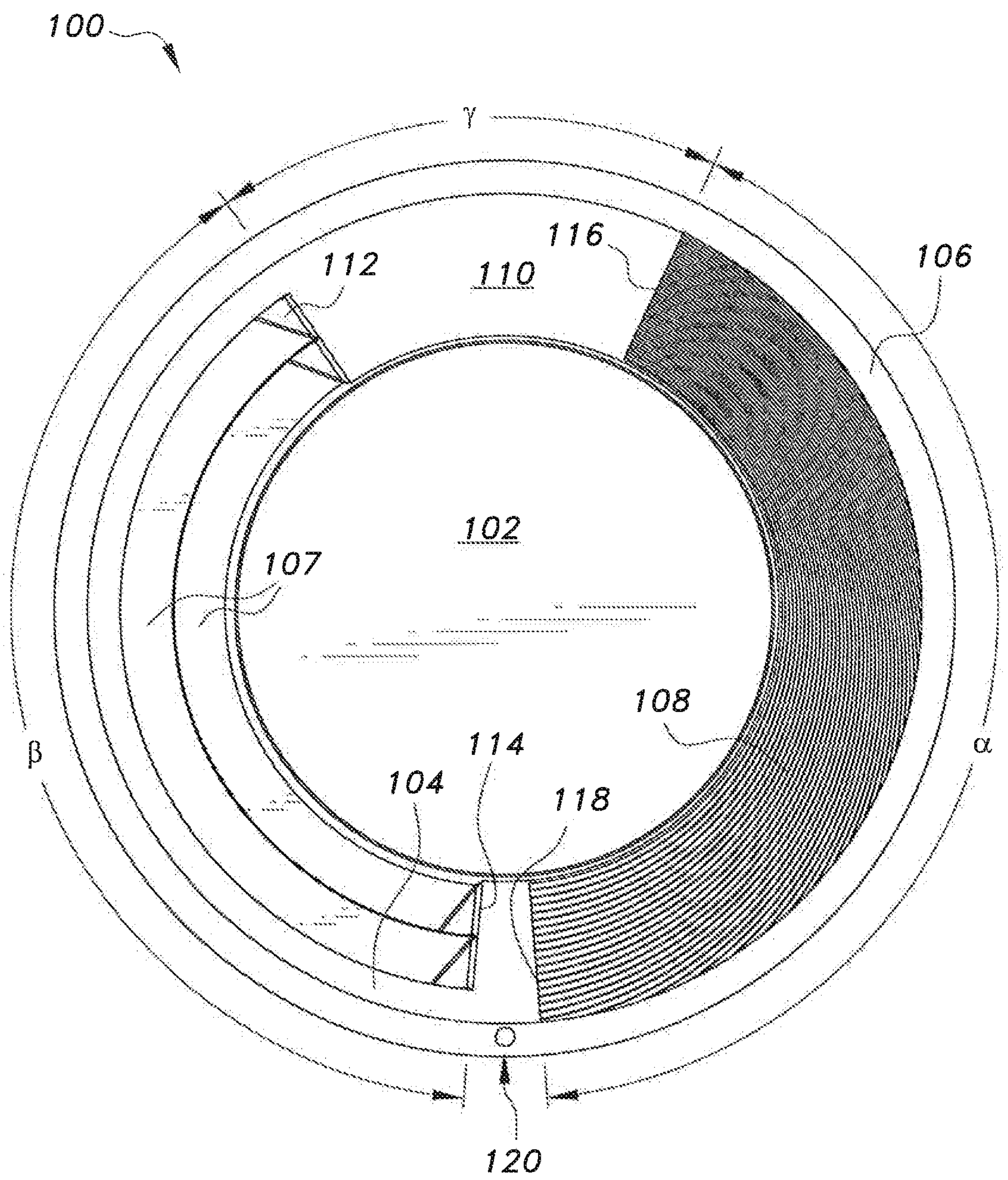
FIG. 4 is a top view of the gold pan of FIG. 1.
Figure 5:
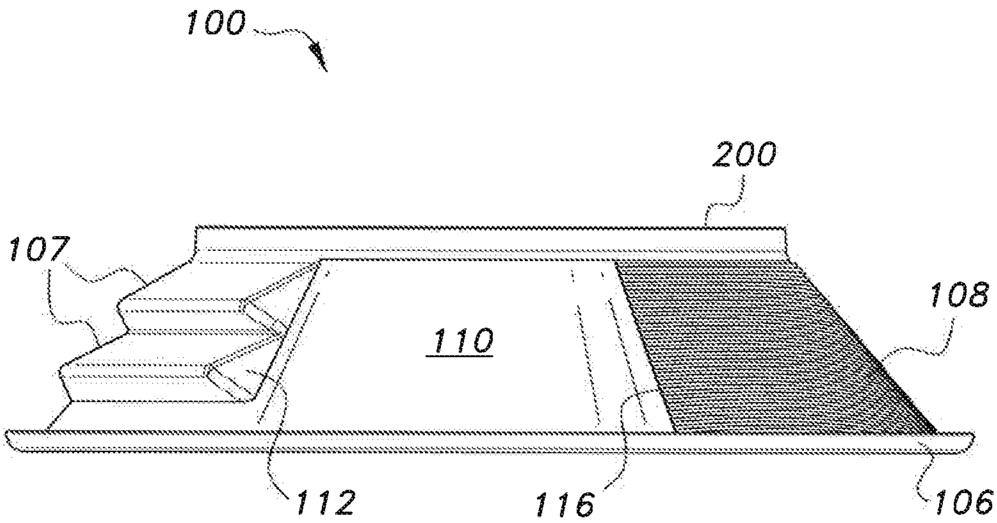
FIG. 5 is a side view of the gold pan of FIG. 1 showing a portion of the peripheral wall when an upper rim of the gold pan faces downwards.
Figure 6:
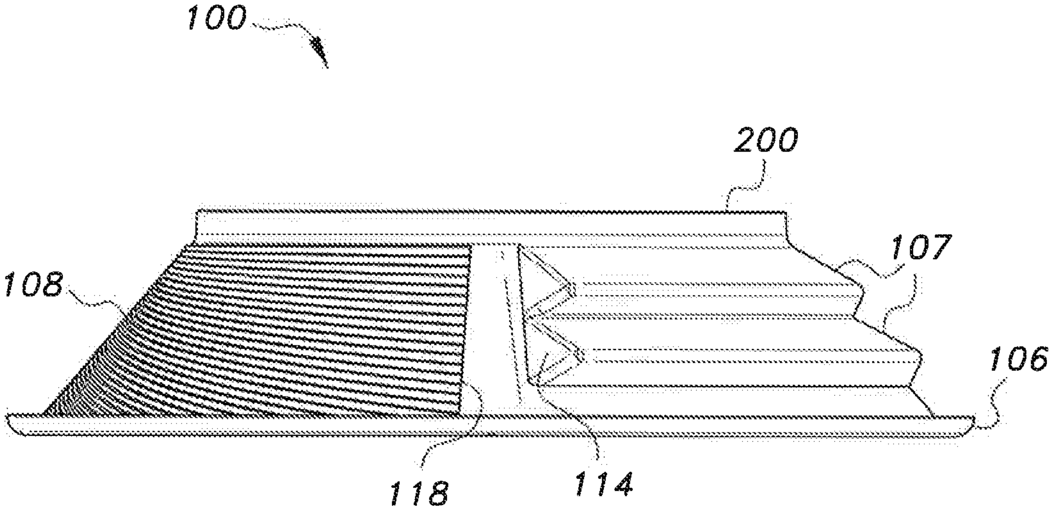
FIG. 6 is a side view of the gold pan of FIG. 1 showing another portion of the peripheral wall when an upper rim of the gold pan faces downwards.
Figure 7:
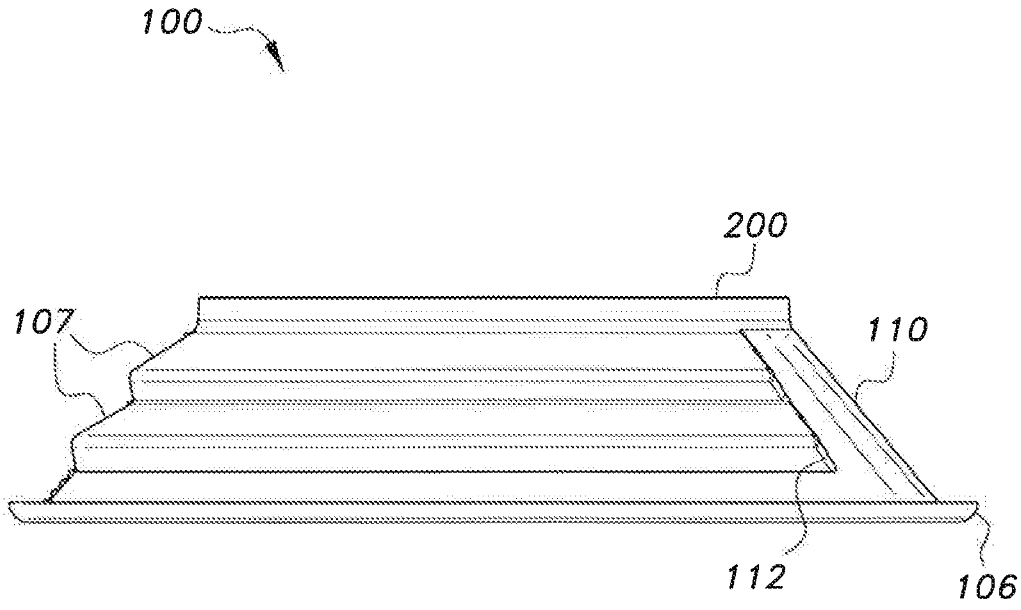
FIG. 7 is a side view of the gold pan of FIG. 1 showing another portion of the peripheral wall when an upper rim of the gold pan faces downwards.
Figure 8:
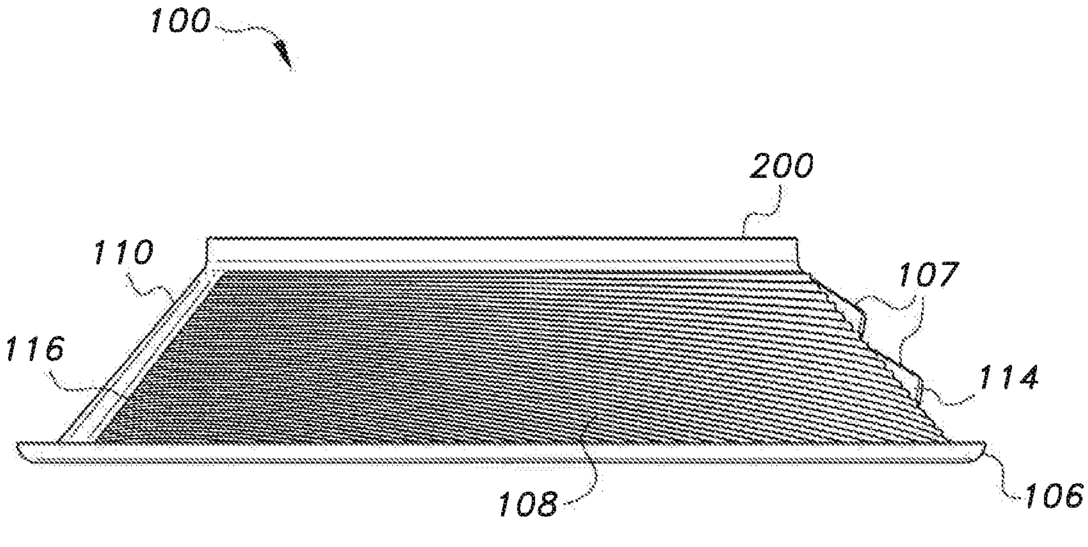
FIG. 8 is a side view of the gold pan of FIG. 1 showing another portion of the peripheral wall when an upper rim of the gold pan faces downwards.
Figure 9:
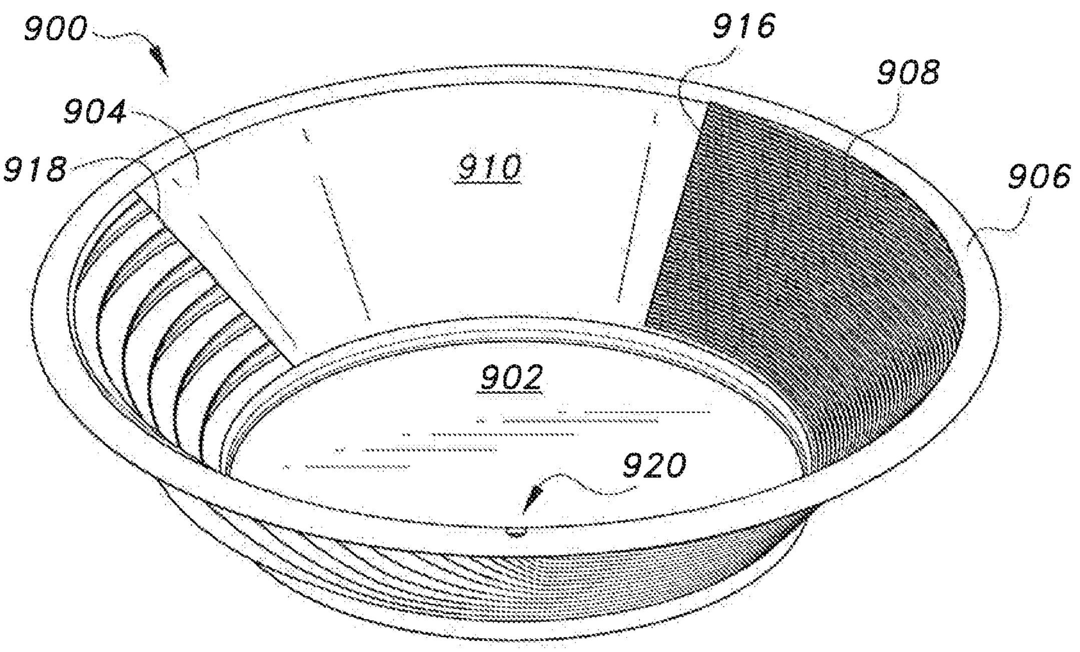
FIG. 9 is a top perspective view of a second embodiment of a gold pan with areas of differing surface textures.
Figure 10:
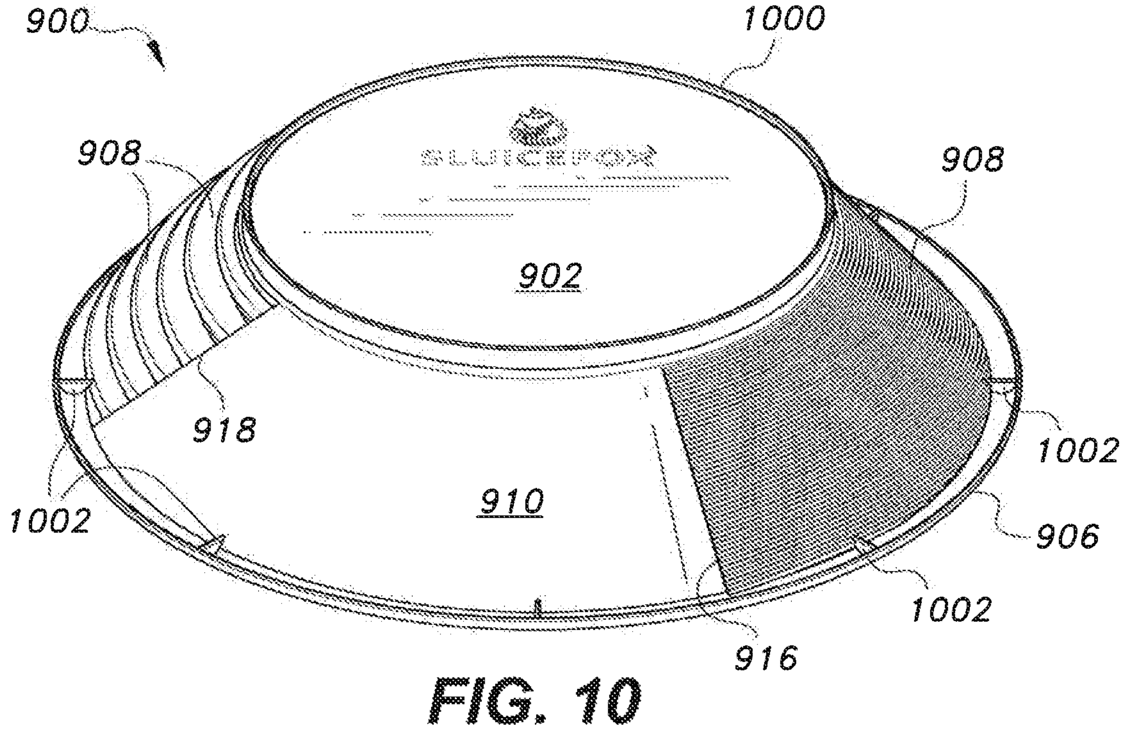
FIG. 10 is a bottom, perspective view of the gold pan of FIG. 9.
Figure 11:
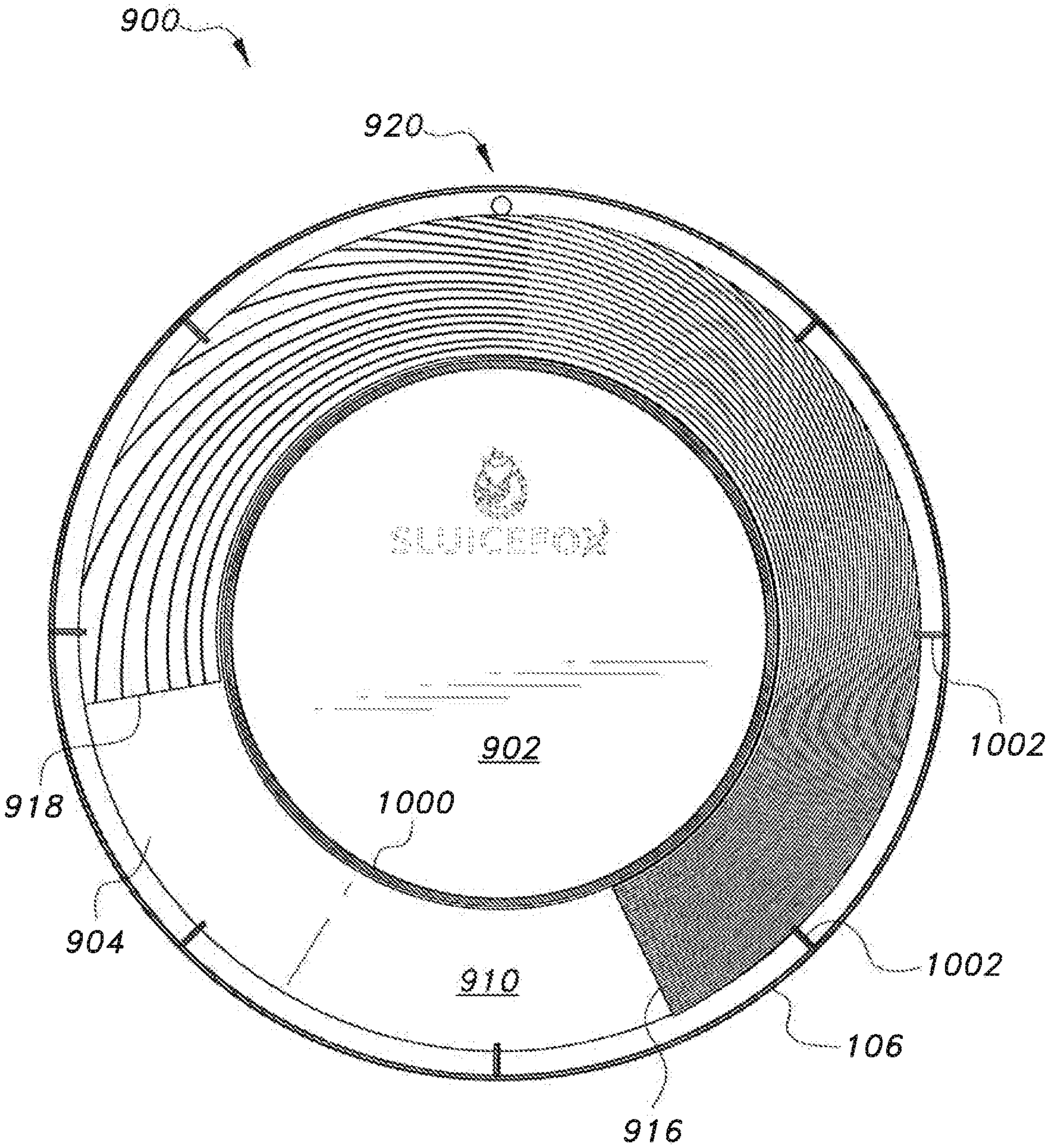
FIG. 11 is a bottom view of the gold pan of FIG. 9.

112 to the second end 114. In an embodiment, the height of the riffles from the second set of riffles is larger than the largest height of the riffles from the first set of riffles. In an embodiment, the width of the riffles from the second set of riffles is larger than the largest width of the riffles from the first set of riffles. As best seen in FIG. 4, the first set of riffles 108 extends along a first portion α of the frustoconical sidewall 104, the second set of riffles 107 extends along a second portion β of the frustoconical sidewall 104, and the smooth portion 110 extends along a third portion γ of the frustoconical sidewall 104.

Figure 17:
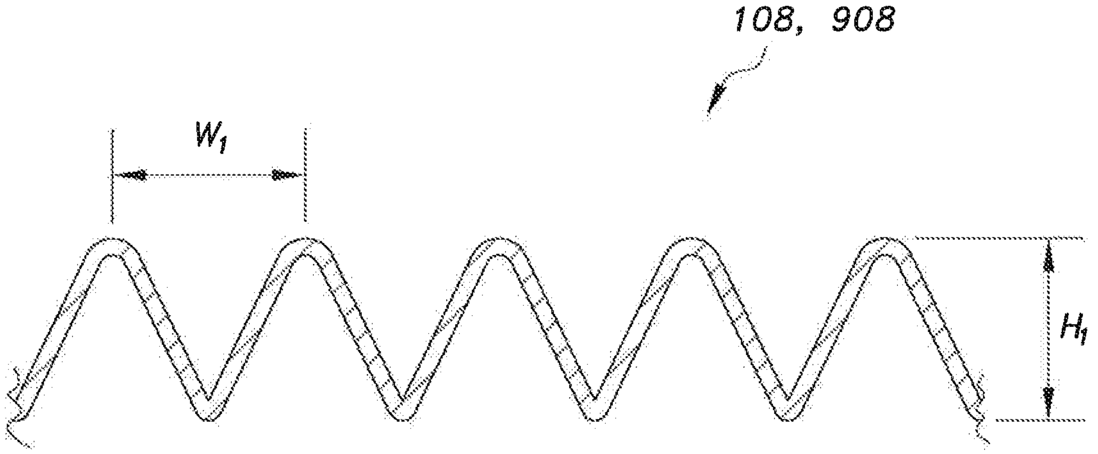
FIG. 17 is an enlarged fragmented cross-section of the larger riffle portion of the gold pans of FIG. 1 and FIG. 9.
Figure 18:
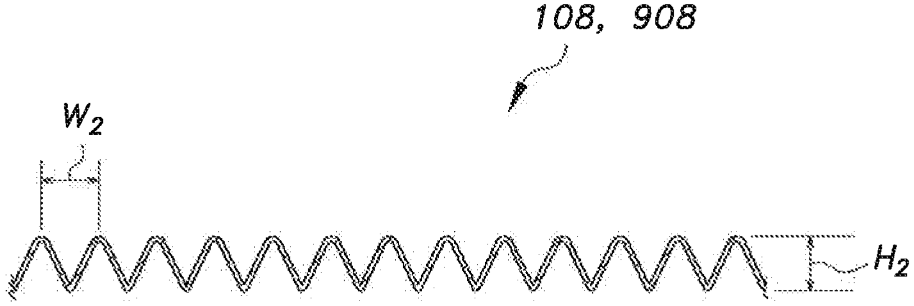
FIG. 18 is an enlarged fragmented cross-section of the smaller riffle portion of the gold pans of FIG. 1 and FIG. 9.

A fragmented cross-section through the first set of riffles 108 closest to the second end 118 is shown in FIG. 17. FIG. 18 is a fragmented cross-section through a plurality of riffles from the first set of riffles 108 closest to the first end 116. As shown, at the first end 116, the riffles have a height $H_2$ that is smaller than the height $H_1$ of the riffles 108 at the second end 118 and a $W_2$ that is smaller than the width $W_1$ of the riffles 108 at the second end 118.

A second embodiment of a gold pan with areas of differing surface textures 900 is shown in FIGS. 9-16. As in the first embodiment, the gold pan 900 includes a disc-shaped, planar bottom panel 902, and an upwardly and outwardly extending frustoconical sidewall 904 extending from the circular perimeter of the bottom panel 902. The circular top of the frustoconical sidewall 904 includes a rounded upper rim 906. The rounded upper rim 906 includes reinforcement ribs 1002, and a hole 920 therethrough, for hanging the gold pan 900 on a hook or other structure. A downwardly extending flange 1000 protrudes from the circular perimeter of the bottom panel 902, for stabilizing the pan 900 on a support surface.

Figure 12:
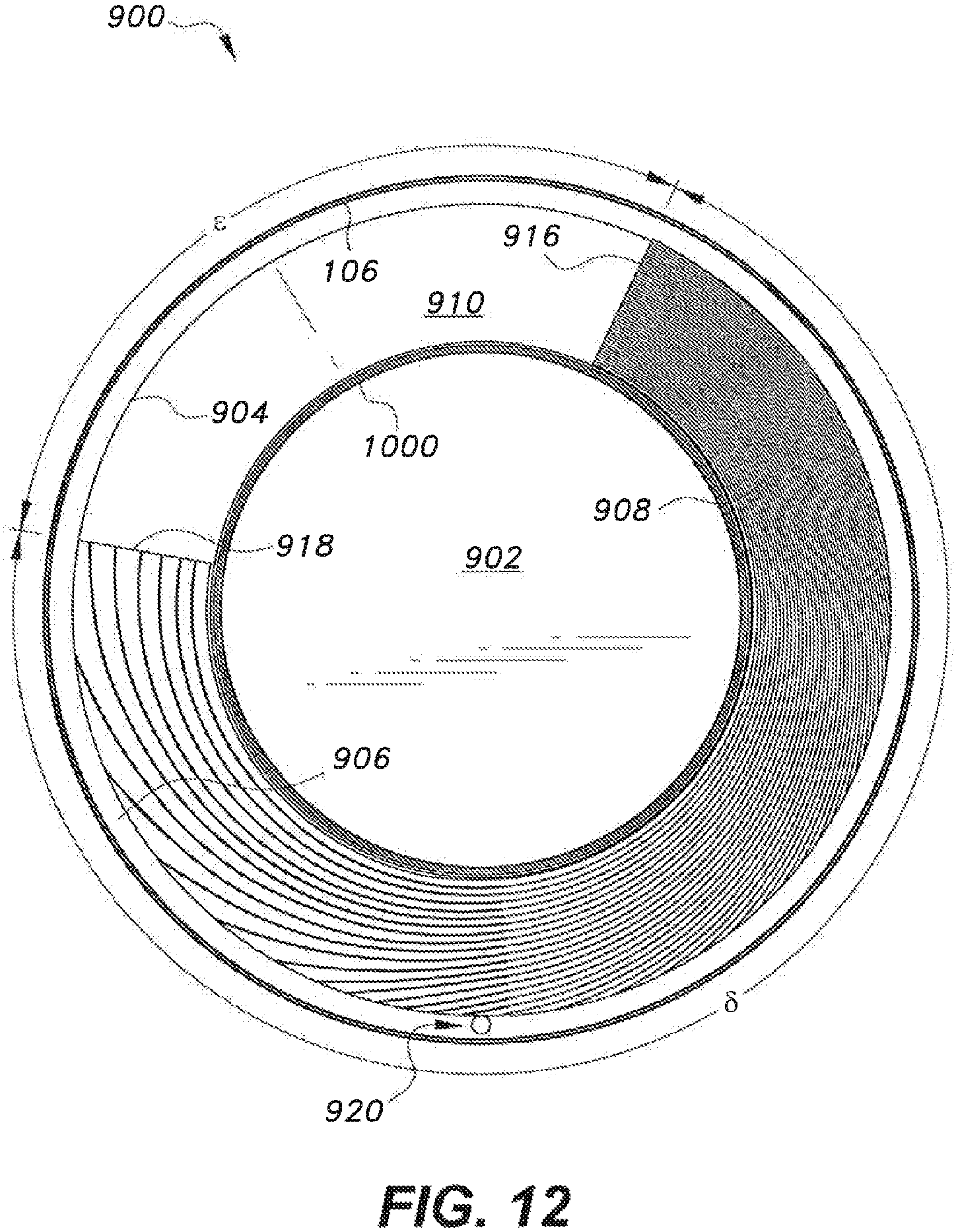
FIG. 12 is a top view of the gold pan of FIG. 9.
Figure 13:
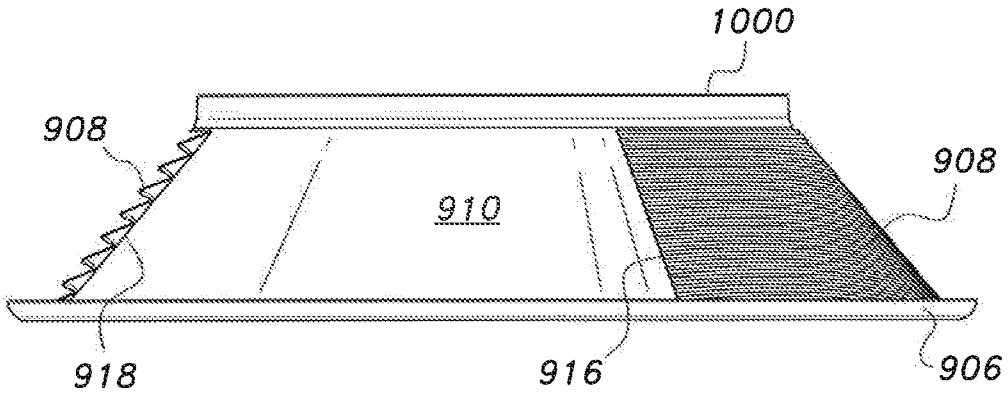
FIG. 13 is a side view of the gold pan of FIG. 9 showing a portion of the peripheral wall when an upper rim of the gold pan faces downwards.
Figure 14:
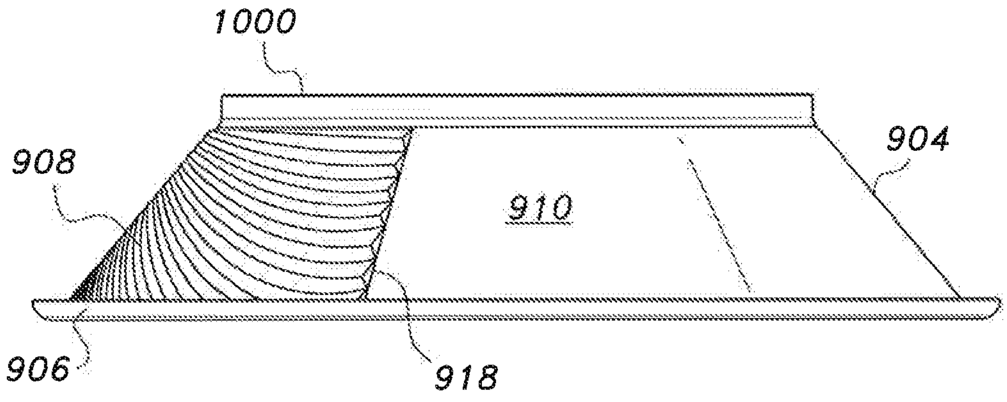
FIG. 14 is a side view of the gold pan of FIG. 9 showing another portion of the peripheral wall when an upper rim of the gold pan faces downwards.
Figure 15:
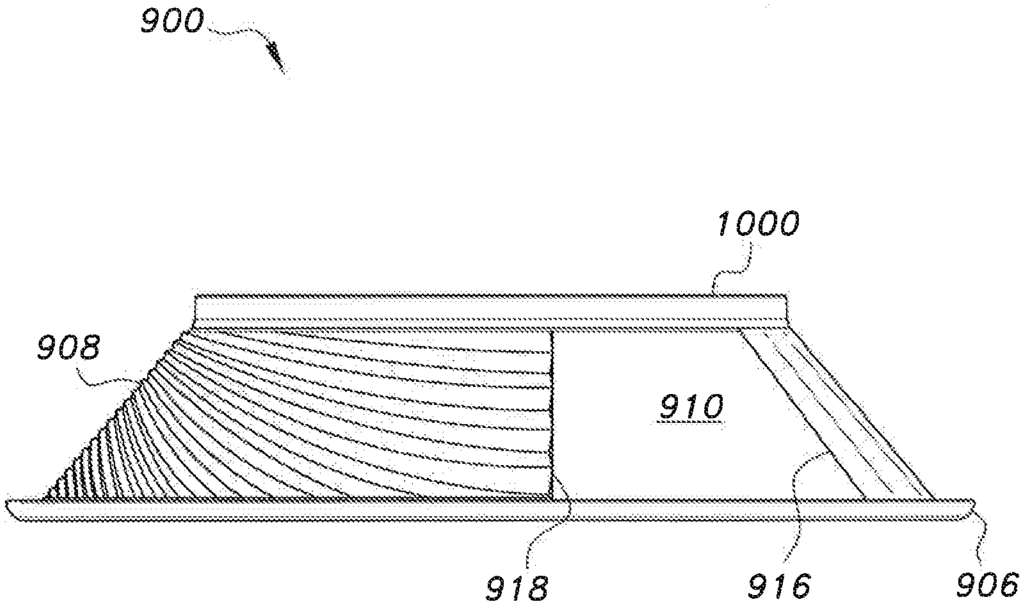
FIG. 15 is a side view of the gold pan of FIG. 9 showing another portion of the peripheral wall when an upper rim of the gold pan faces downwards.
Figure 16:
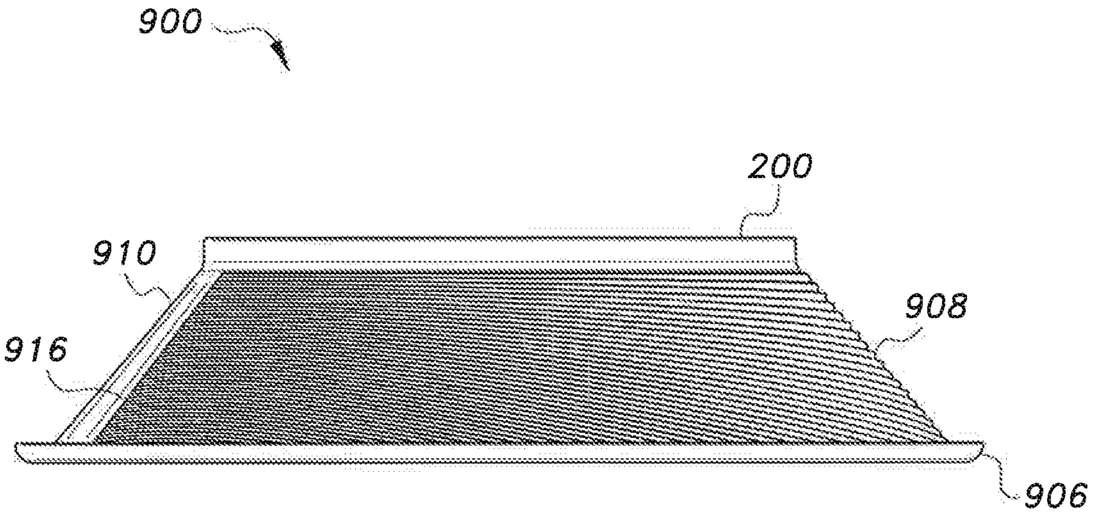
FIG. 16 is a side view of the gold pan of FIG. 1 showing another portion of the peripheral wall when an upper rim of the gold pan faces downwards.

In this embodiment, the frustoconical sidewall 904 includes a single set of tapering riffles 908 and a smooth area 910 between opposing ends of the riffles 908. As best seen in FIG. 12, the smooth area 910 extends along a first portion ε of the frustoconical sidewall 904. The set of tapering riffles 908 includes a first end 916 where riffles 908 are smallest and a second end 918, where riffles 908 are largest. Thus, a width and/or height of the riffles 908 can gradually decrease from the second end 918 to the first end 916. The set of riffles 908 extends along a second portion δ of the frustoconical sidewall 104.

It is to be understood that the gold pan with areas of differing surface textures is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A gold pan with areas of differing surface textures, comprising:

a disc-shaped, planar bottom panel having a circular perimeter;

a frustoconical sidewall extending from the circular perimeter of the bottom panel, the frustoconical side-wall having a circular upper rim; and a first set of riffles extending along a first portion of the frustoconical sidewall, the first set of riffles including a plurality of riffles, each of the riffles having a first end and a second end and a smooth portion between the first end and the second end, wherein:

both a height and a width of the riffles from the first set of riffles gradually decreases from the second end to the first end, wherein the height of each riffle is defined by the depth of each riffle within the frustoconical sidewall and the width of each riffle is defined by the distance between adjacent riffles.

2. The gold pan with areas of differing surface textures according to claim 1, wherein the circular upper rim is rounded.

3. The gold pan with areas of differing surface textures according to claim 2, wherein the circular upper rim includes a plurality of reinforcement ribs.

4. The gold pan with areas of differing surface textures according to claim 3, wherein the circular upper rim includes a hole defined therethrough.

5. The gold pan with areas of differing surface textures according to claim 1, further comprising:

a downwardly extending flange protruding from the perimeter of the bottom panel.

6. The gold pan with areas of differing surface textures according to claim 1, further comprising a second set of riffles having a first end and a second end, wherein a height and a width of the riffles from the second set of riffles is constant from the first end to the second end, and the smooth portion is between the first set of riffles and the second set of riffles.

* * * * *